UNITED STATES PATENT OFFICE.

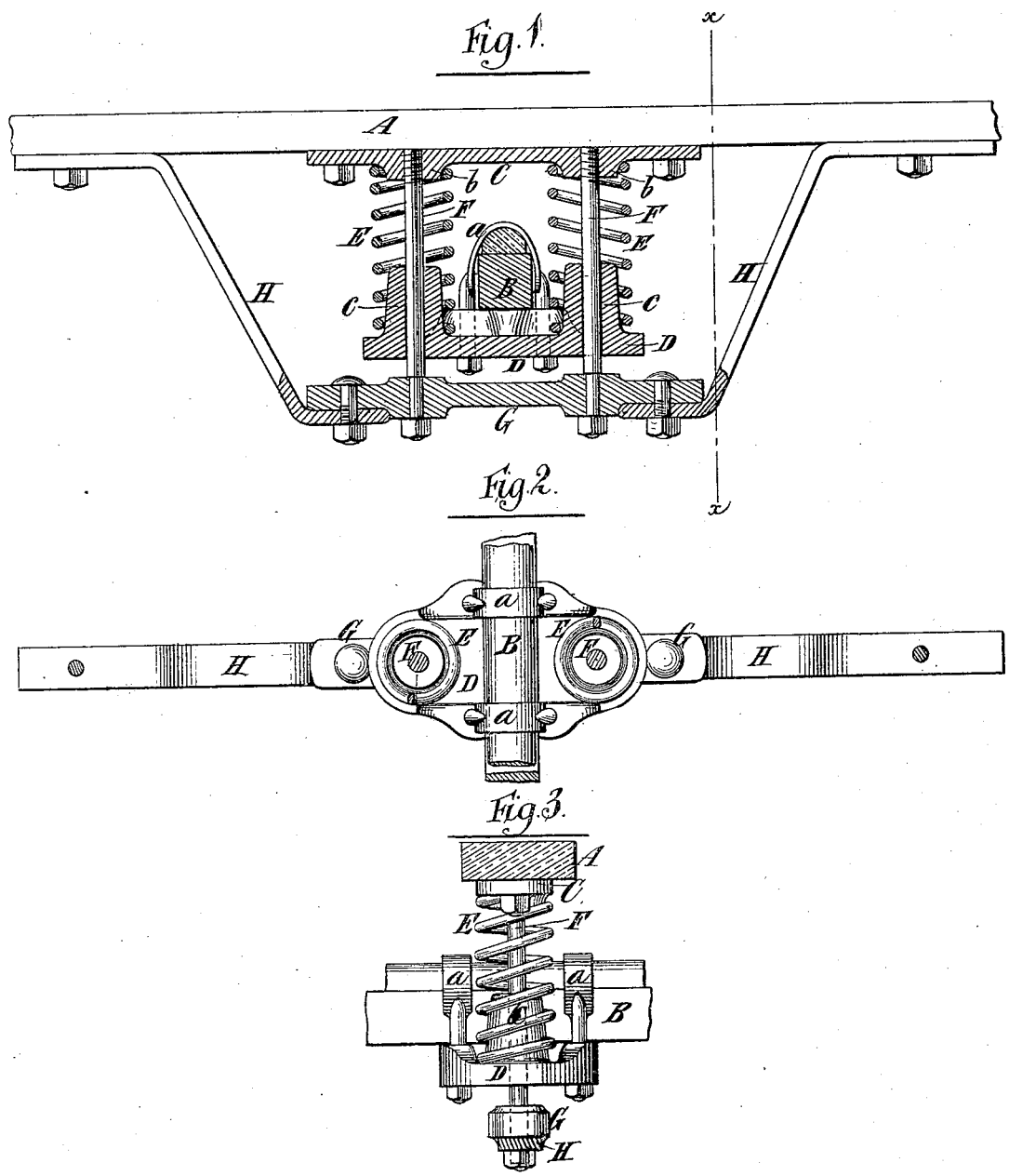

STANTON PALMATIER, OF LEEDS, NEW YORK, ASSIGNOR OF ONE-HALF TO FRANK S. PALMATIER, OF SAME PLACE, AND GEORGE HOWARD, OF PHILADELPHIA, PENNSYLVANIA.

SPRING FOR VEHICLES.

SPECIFICATION forming part of Letters Patent No. 238,427, dated March 1, 1881.

Application filed December 29, 1880. (No model.)

*To all whom it may concern:*

Be it known that I, STANTON PALMATIER, of Leeds, in the county of Greene and State of New York, have invented a certain new and useful Improvement in Springs for Vehicles, of which the following is a specification.

The object of my invention is to provide a simple and desirable method of utilizing spiral or coiled springs for wagons and other vehicles; and my invention consists in the combination, in a wagon or vehicle, of a plate upon which the wagon body or box rests, a supporting-plate secured by clips to the under side of the axle or bolster, spiral or coiled springs arranged between said plates upon opposite sides of the axle or bolster, guide-rods fixed in the plate above said springs and extending through the supporting-plate, a yoke or bar connected with the lower ends of said rods below said supporting-plate, and braces connecting the ends of said yoke or bar with the body of the wagon or vehicle.

In the accompanying drawings, Figure 1 represents a transverse section of a wagon axle and springs arranged according to my invention. Fig. 2 represents a plan thereof, the plate above the springs being removed; and Fig. 3 represents a transverse section upon the dotted line $x\ x$, Fig. 1.

Similar letters of reference designate corresponding parts in all the figures.

A designates a piece or strip, which may be a portion of the frame of a wagon box or body, or upon which the box or body may rest, and B designates one of the axles thereof.

C designates a plate, which is bolted to the under side of the piece or strip A, and upon which rests the weight of the wagon body or box.

D designates a second plate, which I term a "supporting-plate," and which is secured to the axle B by means of axle-clips $a$, as clearly shown, it preferably being attached to the under side of the axle, so as to avoid elevating the wagon body or box any more than is necessary.

Between the plates C and D, and upon opposite sides of the axle B, are arranged spiral or coiled springs E, which are afforded a rigid support upon the plate D, and which are compressed by weights resting upon the top plate, C. To maintain the springs E in proper position the plate C is constructed with bosses $b$, adapted to enter the ends of the springs, and the supporting-plate D is likewise constructed with hubs or projections $c$, about which the lower ends of the springs fit.

F designates guide-rods, the upper ends of which are rigidly fixed in the plate C, and which extend downward centrally within the springs and pass through the hubs or projections $c$ upon the supporting-plate D, and project below said plate. The guide-rods fit loosely in the holes in the plate D, through which they pass, and are enabled to move freely longitudinally therein as the springs E are compressed or become distended.

G designates a bar or yoke, in which the protruding lower ends of the guide-rods are fixed, and which serves to hold the rods at a proper distance apart and to add rigidity to the whole arrangement; and the ends of the yoke or bar G are connected, by braces H, with the piece or strip A. These braces serve to hold the springs firmly to their places, and to center the draft of the team upon the axles.

In Fig. 1 the springs are shown as slightly compressed, and it will be clearly understood that when weight is supported by them the plate C, the yoke or bar F, and the braces G all move downward together.

Although the supporting-plate D is here shown as secured to the axle B, it might with equal advantage be secured in a similar manner to the bolster of a wagon or vehicle.

What I claim as my invention, and desire to secure by Letters Patent, is—

The combination, with the body or box and the axle or bolster of a wagon or vehicle, of a plate upon which rests the body or box, a supporting-plate, and clips whereby it is secured to the under side of said axle or bolster, spiral or coiled springs arranged between said plates upon opposite sides of the axle or bolster, guide-rods secured in the upper plate and extending downward within said springs through the supporting-plate, a yoke or bar connecting the lower ends of said guide-rods, and braces connecting the ends of said yoke or bar with the body or box, substantially as herein described.

STANTON PALMATIER.

Witnesses:
WILLIAM PALMATIER,
JOSEPH HALLOCK.